United States Patent
Huber et al.

(10) Patent No.: US 10,910,787 B2
(45) Date of Patent: Feb. 2, 2021

(54) METHOD FOR PRESERVING THE SYNCHRONISM OF A FOURIER DOMAIN MODE LOCKED (FDML) LASER

(71) Applicant: OPTORES GMBH, Munich (DE)

(72) Inventors: Robert Huber, Lübeck (DE); Tom Pfeiffer, Lübeck (DE)

(73) Assignee: OPTORES GMBH, Munich (DE)

( * ) Notice: Subject to any disclaimer, the term of this patent is extended or adjusted under 35 U.S.C. 154(b) by 0 days.

(21) Appl. No.: 16/620,126

(22) PCT Filed: Jun. 8, 2018

(86) PCT No.: PCT/EP2018/065138
§ 371 (c)(1),
(2) Date: Dec. 6, 2019

(87) PCT Pub. No.: WO2018/224642
PCT Pub. Date: Dec. 13, 2018

(65) Prior Publication Data
US 2020/0106235 A1    Apr. 2, 2020

(30) Foreign Application Priority Data

Jun. 9, 2017 (DE) .......... 10 2017 209 739

(51) Int. Cl.
*H01S 3/08* (2006.01)
*H01S 3/106* (2006.01)
(Continued)

(52) U.S. Cl.
CPC ...... *H01S 3/08004* (2013.01); *H01S 3/08013* (2013.01); *H01S 3/1062* (2013.01); *H01S 3/1109* (2013.01); *H01S 3/1305* (2013.01)

(58) Field of Classification Search
CPC ............ H01S 3/08004; H01S 3/08013; H01S 3/1062; H01S 3/1109; H01S 3/1305
See application file for complete search history.

(56) References Cited

U.S. PATENT DOCUMENTS

| 7,414,779 B2 | 8/2008 | Huber et al. |
| 8,315,282 B2 | 11/2012 | Huber et al. |
| 2009/0174931 A1 | 7/2009 | Huber et al. |

FOREIGN PATENT DOCUMENTS

EP    2557441    2/2013

OTHER PUBLICATIONS

Adler et al. "Extended coherence length Fourier domain mode locked lasers at 1310 nm," Optics Express, Oct. 2011, vol. 19, No. 21, pp. 20930-20939.

(Continued)

*Primary Examiner* — Armando Rodriguez
(74) *Attorney, Agent, or Firm* — Sheridan Ross P.C.

(57) ABSTRACT

The invention relates to a method for maintaining the synchronism of a Fourier Domain Mode Locked (FDML) laser, the FDML laser comprising at least one dispersion-compensated resonator with at least one variably wavelength-selective optical filter, the laser light circulating in the resonator at a circulation frequency, and the wavelength selectivity of the filter being repeatedly modified at a syntonising rate, the FDML laser being synchronous when the syntonising rate is an integral multiple of the circulation frequency. Said method is characterised by the following steps: a) at least a portion of the laser light is coupled out of the resonator; b) at least a portion of the decoupled laser light is detected by means of a photodetector; c) amplitudes in the measuring signal of the photodetector are counted during successive counting intervals; and d) the circulation frequency or syntonising rate is adjusted such that the ratios of the count value to the lengths of the counting intervals are maintained within a predetermined nominal value interval.

16 Claims, 7 Drawing Sheets

(51) Int. Cl.
      H01S 3/11      (2006.01)
      H01S 3/13      (2006.01)

(56) References Cited

OTHER PUBLICATIONS

Li et al. "Monitoring the frequency detune of harmonically mode-locked Fourier domain mode locked fiber laser using the supermode noise peaks," 2014 Conference on Lasers and Electro-Optics (CLEO)—Laser Science to Photonic Applications, The Optical Society, Jun. 8, 2014, pp. 1-2.
Slepneva et al. "Convective Nozaki-Bekki holes in a long cavity laser," Proceedings of SPIE, Mar. 9, 2016, vol. 9732, 97320F, 6 pages.
Translated International Search Report for International (PCT) Patent Application No. PCT/EP2018/065138, dated Sep. 27, 2018, 2 pages.
Official Action for German Patent Application No. 102017209739.6, dated Mar. 14, 2018, 5 pages.

METHOD FOR PRESERVING THE SYNCHRONISM OF A FOURIER DOMAIN MODE LOCKED (FDML) LASER

CROSS REFERENCE TO RELATED APPLICATIONS

This application is a national stage application under 35 U.S.C. 371 and claims the benefit of PCT Application No. PCT/EP2018/065138 having an international filing date of 8 Jun. 2018, which designated the United States, which PCT application claimed the benefit of German Patent Application No. 10 2017 209 739.6 filed 9 Jun. 2017, the disclosure of each of which are incorporated herein by reference.

The invention relates to a method for preserving the synchronism of a Fourier Domain Mode Locked (FDML) laser.

A FDML laser comprises at least one resonator having at least one variable wavelength-selective optical filter, wherein the laser light circulates in the resonator with a round-trip frequency and the filter is repeatedly altered in its wavelength selectivity with a tuning rate. The tuning rate means here the mean number of passes of the filter through its tuning bandwidth per unit of time. If the filter is strictly periodically tuned, e.g., by means of an electronic actuation, this is also known as tuning frequency.

For the continuous operation of the laser, it is essential for the tuning rate of the filter to be synchronized with the round-trip frequency of the laser light, so that each of the circulating wavelengths reaches the filter again at a time when the filter is transmissible for this very wavelength. One may speak of a synchronism of a FDML laser if the tuning rate is as close as possible to an integer multiple of the round-trip frequency—disregarding chromatic dispersion. A FDML laser thus emits light whose wavelength is altered repeatedly. This is usually known as a wavelength sweep. Laser light sources which emit light with repeated wavelength sweeps are usually called "swept sources".

A FDML laser is characterized in that it can form and emit laser modes for all wavelengths suitable for the filter and thus can generate a swept-source light with a time-variable wavelength, large coherence length, small line width and high spectral energy density. The sweep rate of the FDML laser corresponding to the tuning rate of the filter is very high: it corresponds at least to its round-trip frequency. FDML lasers are therefore preferred light sources for Fourier Domain Optical Coherence Tomography (FD-OCT), which today is finding broad application in materials testing and in medical imaging.

Optical filters, which can be tuned in very short time over their tuning bandwidth, are designed for example in the manner of a Fabry-Perot interferometer and are known for example from the document EP 2 557 441 A1. For example, tuning rates up to 1 MHz are realizable with these.

The round-trip frequency of the laser light in the resonator of the FDML laser is to correspond to an integer fraction of the tuning rate and, in this respect, has an upward limit determined by the filter. This requires a resonator with an optical path length between several hundred meters and kilometers. For its realization, the laser light is customarily passed through a resonator comprising a sufficiently long wound glass fiber as a delay line. At the same time, such a fiber introduces chromatic dispersion.

Practical designs of FDML lasers are known for example from the documents U.S. Pat. No. 7,414,779 B2 and U.S. Pat. No. 8,315,282 B2 and are usually entirely fiber-based. In these examples, besides a tunable filter, an optically or electrically pumped laser-active medium ("gain medium") is also integrated in the light-conducting fiber.

The chromatic dispersion can be compensated by hardware for the most uniform possible light intensity over all emitted wavelengths. This is possible in a FDML laser with fiber-based delay line through passive components, for example, which are integrated in the delay line and couple wavelength-selective light portions into additional delay lines, see for example Desmond C. Adler, Wolfgang Wieser, Francois Trepanier, Joseph M. Schmitt, and Robert A. Huber, "Extended coherence length Fourier domain mode locked lasers at 1310 nm", Opt. Express 19, 20930-20939 (2011). In the context of this specification, we shall speak of a dispersion-compensated resonator when the resonator comprises hardware configurations for the compensation of the chromatic dispersion.

The above-mentioned documents U.S. Pat. No. 7,414,779 B2 and U.S. Pat. No. 8,315,282 B2 describe the components and variants of FDML lasers in great detail. Moreover, U.S. Pat. No. 8,315,282 B2 also provides information about control of the tuning rate of the optical filter from the light coupled out from the FDML laser in the sense of a feedback, in order to match the tuning rate to an integer multiple of the round-trip frequency and maintain it during ongoing operation. The control is based on an intensity measurement of an outcoupled portion of the radiation circulating in the resonator. Intensity deflections are detected and integrated as a function of the time, in order to determine a noise value which can then be minimized as the control target. The ongoing need for control stems from the fact that the round-trip frequency depends on perturbation factors on the fiber-bound delay line and may change during the ongoing operation.

The control is usually oriented to the tuning rate, which can be controlled especially easily by modification of the electronic actuation of the filter. Among the dominant perturbation factors are deflections in the ambient temperature of the fiber, which alternatively opens up the possibility of producing the synchronism of the laser by a temperature control of the fiber, for example.

But, as has been shown in the meantime, conventional control is not yet precise enough.

Upon investigating the outcoupled radiation of a conventional synchronized FDML laser of the prior art with a high-resolution oscilloscope (50 GHz detection bandwidth), the inventors have discovered that the laser switches off during each sweep very many times for very short periods— in the subnanosecond range. This switching off not only results in very fast intensity deflections, but also in particular in a reduced coherence of the laser radiation, because new laser modes must be constantly re-established. Varying the tuning rate of the filter manually indicates an extremely sensitive correlation between the switch-offs and the synchronism of the laser. Thus, at a round-trip frequency of several hundred kilohertz, variations in the tuning rate of several millihertz already result in increased switch-offs and thus a distinct worsening of the laser emission. Such slight variations in the round-trip frequency occur already at temperature deflections of the fiber of around one thousandth of a degree.

It is thus the object of the invention to create a method for control of a FDML laser which enables ongoing stable operation of the laser with less noise and higher coherence than in the prior art.

The object is achieved by a method for preserving the synchronism of a Fourier Domain Mode Locked (FDML) laser, wherein the FDML laser comprises at least one dispersion-compensated resonator having at least one variable wavelength-selective optical filter, wherein the laser light in the resonator circulates with a round-trip frequency and the filter is repeatedly altered in its wavelength selectivity with a tuning rate, wherein the FDML laser is synchronized when the tuning rate is an integer multiple of the round-trip frequency, characterized by the steps a. outcoupling of at least one portion of the laser light from the resonator;
b. detecting at least one portion of the outcoupled laser light with at least one photodetector;
c. counting the deflections in the measurement signal of the photodetector during consecutive counting time intervals;
d. controlling the round-trip frequency or tuning rate such that the ratios of the count values to the lengths of the counting time intervals are maintained in a predetermined setpoint interval.

The dependent claims indicate advantageous embodiments of the invention.

The method according to the invention is based on the already ongoing operation of a FDML laser, i.e., it is to start when the laser has achieved a synchronized state, as evaluated according to the prior art. It then causes this synchronism to remain intact over the further time of operation, and replaces other control measures, as long as the laser is not suddenly and significantly forced out of its controlled operating state, e.g., by external influence, such as by mechanical vibration or power grid deflection. The required steps for placing a FDML laser in synchronism or restoring its synchronism are familiar to the person skilled in the art from the literature, among other things.

For example, a simple measurement of the output power of the FDML laser in dependence on various tuning rates can be used to set the FDML laser roughly at a tuning rate located approximately at the power maximum. Such a power maximization is described in U.S. Pat. No. 7,414,779 B2 and by Murari, and it for adapting the round-trip frequency and the tuning up to a deviation of 1-10 Hz. For a usual round-trip frequency on the order of a few hundred kilohertz, this corresponds to a precision of $10^{-5}$ to $10^{-6}$. This procedure may be called a "rough control" and can be used for starting a FDML laser. The invention, on the other hand, now provides an additional "fine control," which can take over from the rough control and further improve the laser quality.

A combination of rough control and fine control is essentially advantageous beyond the starting process of the FDML laser as well, as the rough control may also be used as a "catch-up procedure" when the method according to the invention is temporarily unable to provide the control. This may occur, for example, if for whatever reason so many counting events arise that the measurement electronics can no longer detect a sizeable number of them. Then, upon passing beyond a predetermined maximum count value in a counting time interval, there can be a switching from the proposed fine control to a rough control by known methods, e.g., by means of the described power maximization. Once the rough control has returned the laser to an almost synchronized state, the fine control can take over the control once more. Alternative methods for setting up a rough control include a minimization of the integrated noise power or a direct measurement of the rotation time of the laser light with a pulse signal from a photodiode.

The major difference between the method according to the invention and the conventional integrating of the measurement signal of a photodetector is that, with the invention, no attention is paid to the actual duration of a switch-off and/or the length of time of an intensity dip.

Instead, only the occurrence of a dip is registered and a counter is incremented if the event occurs within a counting time interval. The counter reading at the end of the counting time interval is then placed in relation to the length of the counting time interval, i.e., a frequency of the deflections in the measurement signal of the at least one photodetector is determined. This ratio is continuously re-determined in for further counting time intervals, i.e., the counter is set to zero at the start of each counting time interval.

The counting time intervals may be predetermined in such a way that the start and end of at least the respectively next counting time interval are established before the counting process begins in that next counting time interval. Preferably, counting time intervals of equal length having the same time spacing from each other may be provided from the start. But it may also be advantageous to alter the length of the counting time intervals during the ongoing control, for example, to shorten (lengthen) it by a predetermined percentage for later counting time intervals if one or more count values of the previous counting time intervals are above (below) predetermined threshold values. Moreover, it may be advantageous to provide time gaps of predetermined duration between two consecutive counting time intervals.

These predetermined counting time intervals may be adapted during the operation, for example, a short time interval is advisable at the start in a range where many dips occur, so as not to overload the counter, i.e., generate too many counting events. Then, if the control after a certain time is already working well enough so that only very few counting events per counting interval occur, the counting window may be lengthened. It may also be shifted into stronger and weaker optical noise frequency ranges accordingly. Adaptive approaches to the control may also be based on a variable position and width of the counting time intervals, the counting threshold values, or an amplitude weighting factor. The width of the intervals may be increased if the events become less frequent, and the position may be shifted more in the direction of the center of the sweep.

Alternatively, the length of the counting time intervals may also be measured directly by using a counter as a stop watch. The time measurement starts with zeroing the counter and ends upon reaching a predetermined count value.

The control according to the invention may work entirely asynchronously, i.e., the counting time intervals do not need to be synchronized with the laser in any way.

In all the aforementioned instances, ratios of count values to counting time interval lengths can be determined that are suitable for the control according to the invention. These ratios are to be re-determined repeatedly in consecutive counting time intervals and be maintained within a predetermined setpoint interval by controlling the round-trip frequency or the tuning rate. The lower limit of the setpoint interval may preferably be set to zero, while, depending on the particular laser design, the upper limit may be set empirically by the skilled person through observation of the laser behavior.

In general, the aim is to minimize the count values or ratios, i.e., it is desirable that the ratio values, for example, are as close as possible to the lower limit of the setpoint interval. However, the laser properties drift unavoidably and very quickly on account of the aforementioned extreme sensitivities, and so it is feasible to provide a reaction tolerance for the control by allowing a value corridor for the ratio values that does not cause regulatory change in the round-trip frequency or the tuning rate. Only if the ratio values break out from this corridor will the control become active and once again bring the ratio values back into the corridor, for example by altering the frequency of a frequency generator used to tune the optical filter. In this way, it can be avoided that the control cannot keep pace and/or starts to oscillate.

It may furthermore be advantageous to adaptively predetermine the setpoint interval once again during the ongoing control, i.e., to change the setpoint interval for later counting time intervals in regard to at least one setpoint interval limit, if the ratio values of previous counting time intervals are subject to overall very strong deflections and the reaction tolerance of the control is to be increased until further notice, for example. Thus, the setpoint interval is predetermined in the sense of evaluating each determined ratio value for the purpose of a decision as to control measures; however, to this end, it is not necessarily fixed at firm interval values during the entire operating period of the laser.

It should further be noted in this context that experiments with a FDML laser controlled according to the invention specifically for imaging of the optical coherence tomography (OCT) type have shown that a readjustment by a few millihertz has no noticeable influence on the image quality. That is, a slight jitter due to continual readjustment may be quite acceptable for OCT. This, then, allows in turn a pure minimum control principle whereby the control changes the frequency slightly after each counting time interval. Whenever the count value in an interval increases as compared to the preceding interval, the direction of the control in the following interval is changed, so that the control works toward a count value of zero. The duration of the counting time interval is preferably adaptively adjusted, the fewer the counting events the greater the duration.

The deflections in the measurement signal of the photodetector may in part depend directly on the timing of the circulating laser light in the resonator or the timing of the filter. The frequency range of the round-trip frequency and its upper harmonics, however, lies far beneath the frequencies which can be meaningful for the subnanosecond laser dips of interest here. Preferably, therefore, frequency components in the measurement signal for the first N multiples of the round-trip frequency should be suppressed, N being a predetermined natural number. Particularly preferably, the measurement signal is highpass-filtered with a limit frequency up to 100 MHz. Thus, for an exemplary round-trip frequency of 411 kHz, $1 \leq N \leq 243$ may be selected, where at least $N \geq 100$ is preferable.

It is furthermore regarded as being an especially advantageous embodiment of the invention to increment the counter during a counting time interval only when an exceptionally large deflection occurs in the measurement signal. Starting from an initially synchronized laser in which deflections in the measurement signal are largely noise-related, the amplitudes $A(k)$ of the deflections, for example, may at first be considered as a Gaussian distributed random quantity and compute over a short period of time a finite sample a traditional standard deviation, e.g.

$$\sigma = \sqrt{\frac{1}{n}\sum_{k=0}^{n}(A(k) - \langle A \rangle)^2}$$

with $\langle A \rangle$ as the mean value of the measurement signal. According to this, a threshold value, or "bias" B, may be set, for example $B = 3*\sigma$. Then, if deflections occur with the condition $|A(k) - \langle A \rangle| > B$—due to a worsening of the synchronism, among other things these may be regarded as exceptionally large and thus relevant to the control, while the others are disregarded as being due to stochastic noise. Preferably, only those deflections in the measurement signal are counted whose difference from the mean value of the measurement signal is above a predetermined threshold value. This procedure moreover emphasizes the distinction from the conventional control of the laser based on a measurement signal integral, since here a non-linear weighting of the measurement signal components is done. In other words, in this case very little attention is paid to the magnitude of the deflections in the measurement signal, and the extent of the measured intensity therefore dips. There is only a classification into relevant and not relevant.

In an alternative embodiment, a threshold value for the counting is determined by a simple comparison with the largest amplitudes occurring in the measurement signal. For example, threshold values can be set for 5%, 10%, 30%, 50% or 75% of the maximum deflection.

By introducing a threshold value, the method is extremely robust to external perturbations, dark current, and electronic noise.

Most importantly, the control process described above works with a high degree of precision, around 100 to 1000 times more precisely, than controls proposed thus far, which for example only controlled for power. Under good conditions, accuracy is below one millihertz, which at a tuning rate of 400 kHz corresponds to a relative running accuracy of almost $10^{-9}$.

The invention is explained more closely in the following with the aid of figures.

An exemplary experimental structure of a FDML laser has a resonator length of around 500 m, a round-trip frequency of 411 kHz, a tuning bandwidth of around 130 nm and a tuning rate of 411 kHz. The passband wavelength $\lambda(t)$ follows the time variation of a sine function about the central wavelength $\lambda_0 = 1295$ nm, but only the most linear possible rising segment of the sine function is used for the laser light, corresponding to one eighth of the function curve. Accordingly, the laser-active medium is optically pumped only for one eighth of each round-trip period. The duration of a sweep thus amounts to 1/3.288 MHz=304 nanoseconds.

Figure 1:
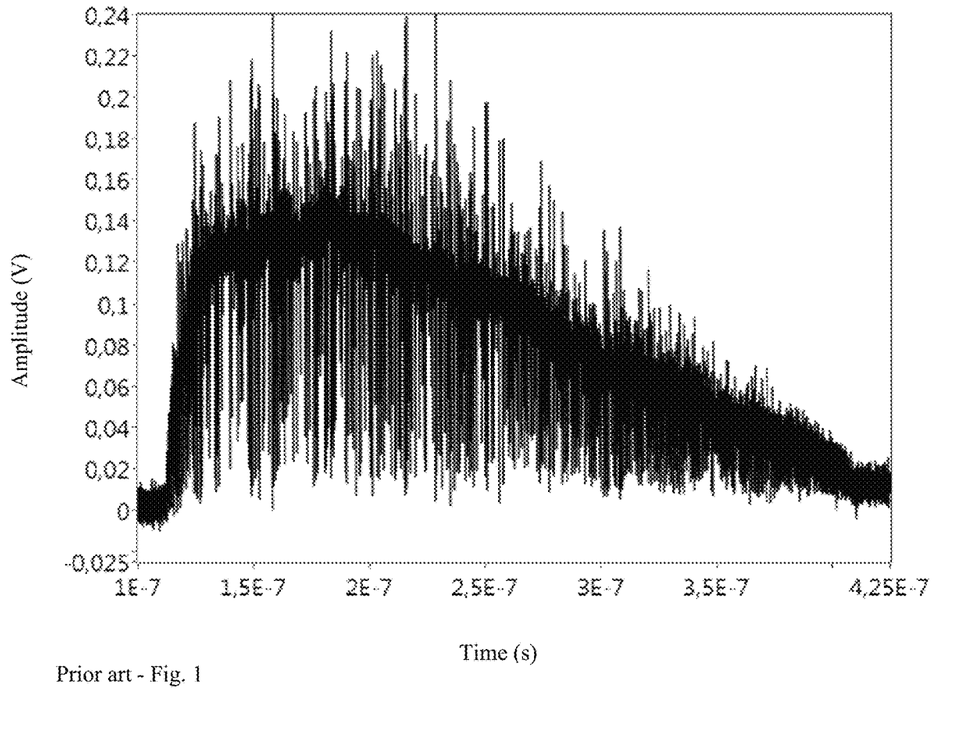
FIG. 1 shows a plot of the laser emission (voltage signal) for an almost synchronized FDML laser with control according to prior art, measured with a high-resolution oscilloscope (50 GHz)
Figure 2:
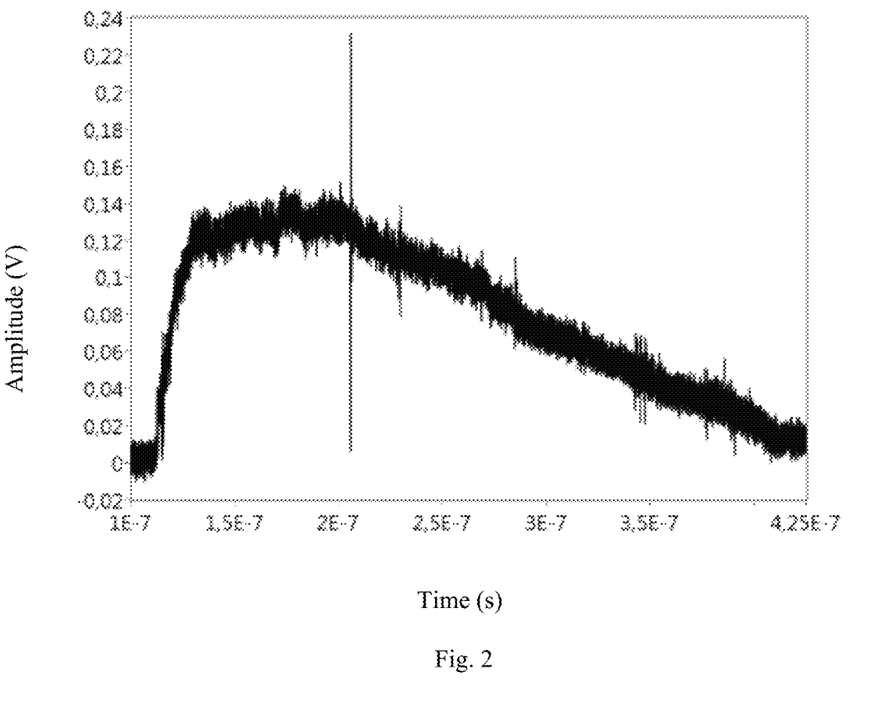
FIG. 2 shows a plot of the laser emission as in FIG. 1 for a FDML laser controlled with the invention.

FIG. 1 shows the intensity distribution measured with a high-resolution oscilloscope (detection bandwidth 50 GHz) of an outcoupled laser light component over the duration of a sweep. The time axis thus corresponds at the same time to a wavelength axis, and the mean intensity varies with the wavelength. The measurement curve in FIG. 1 shows the intensity of a FDML laser running synchronized according to prior art. The many very brief deflections in the measurement signal are very well evident at this resolution, but cannot be detected with conventional measurement electronics (detection bandwidth<2 GHz) available for customary controls. If these deflections are utilized in the positive or negative direction according to the control method of the invention, a significantly improved intensity distribution can be achieved, as shown in FIG. 2.

Figure 3:
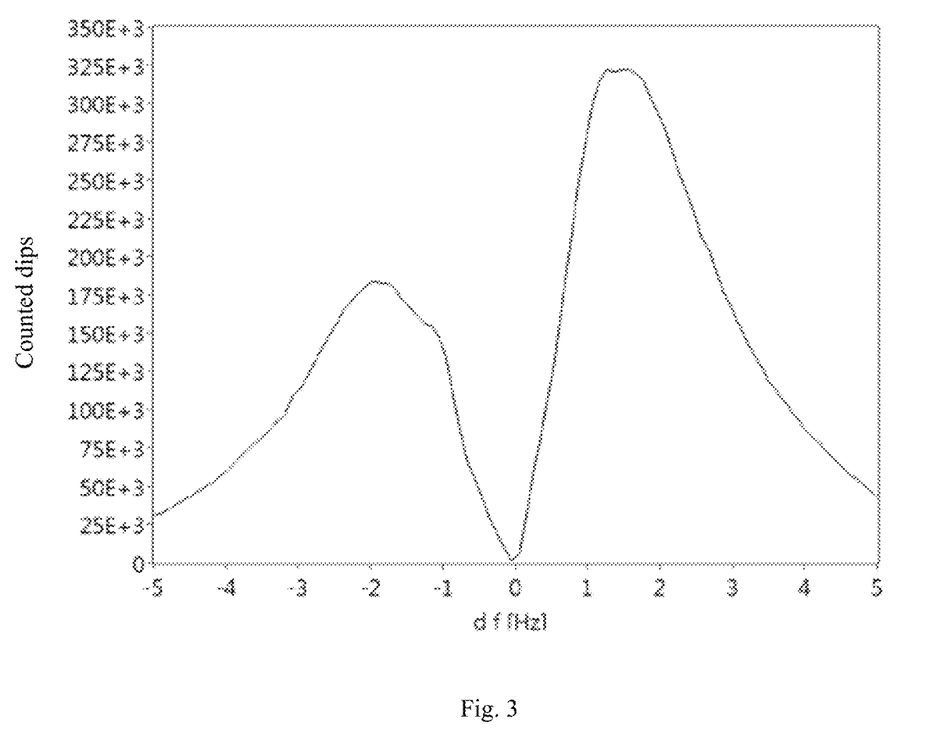
FIG. 3 shows a plot of the counted dips in the measurement signal upon variation of the tuning rate by ±5 Hz in the vicinity of the round-trip frequency
Figure 4:
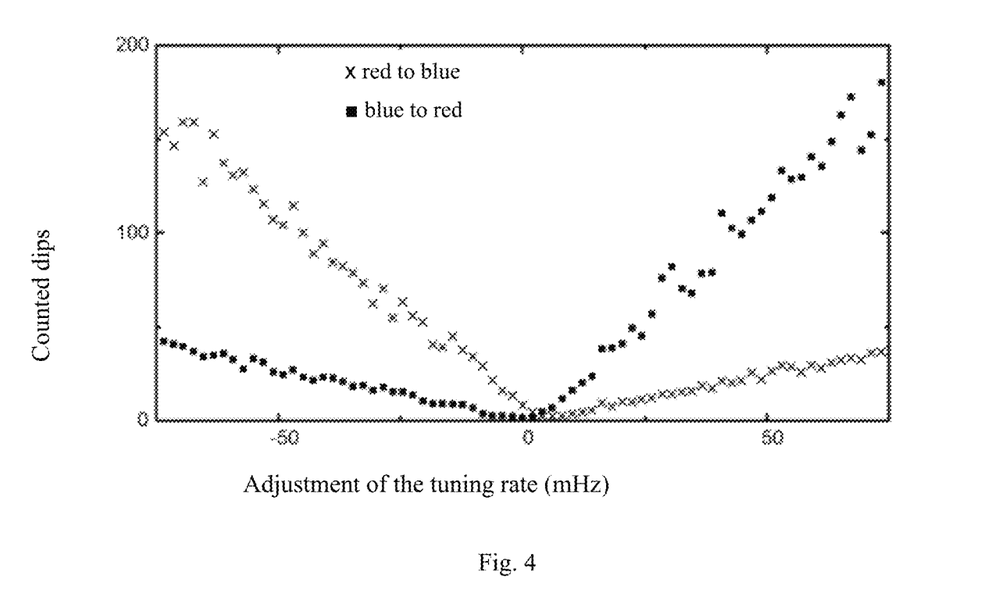
FIG. 4 shows a plot of the number of intensity dips counted directly with a high-resolution oscilloscope (50 GHz) upon variation of the tuning rate by ±100 mHz in the vicinity of the round-trip frequency.

The precision of the control according to the invention becomes especially clear when the count values of the deflections—in this case measured at regularly spaced and equally sized counting time intervals—are looked at more closely under controlled variation of the tuning rate. The plot in FIG. 3 shows the count values in the vicinity of ±5 Hz about the optimal tuning rate which brings about the synchronism of the laser. At synchronism, a global minimum of deflections can be seen, while the flanks of the measurement curve near the minimum already show strong rises at variations on the order of 100 mHz. This makes it possible to set up a control which can already detect and compensate for a frequency spreading by a few millihertz. To illustrate, FIG. 4 shows the mean number of intensity dips in a laser sweep, measured directly with a high-resolution oscilloscope (50 GHz), under variation of the tuning rate by only ±100 mHz. The measurement data differ according to whether the wavelength is shortened (red-to-blue) or lengthened (blue-to-red) during the sweep.

With the help of the control according to the invention, for the first time a long-lasting stable operation of a FDML laser is realized with heretofore unprecedented low noise and at the same time the best of coherence properties. The control works very precisely and proves to be nonsensitive to external influences, such as radiation, and to variations of the laser light spectrum circulating in the resonator.

Figure 5:
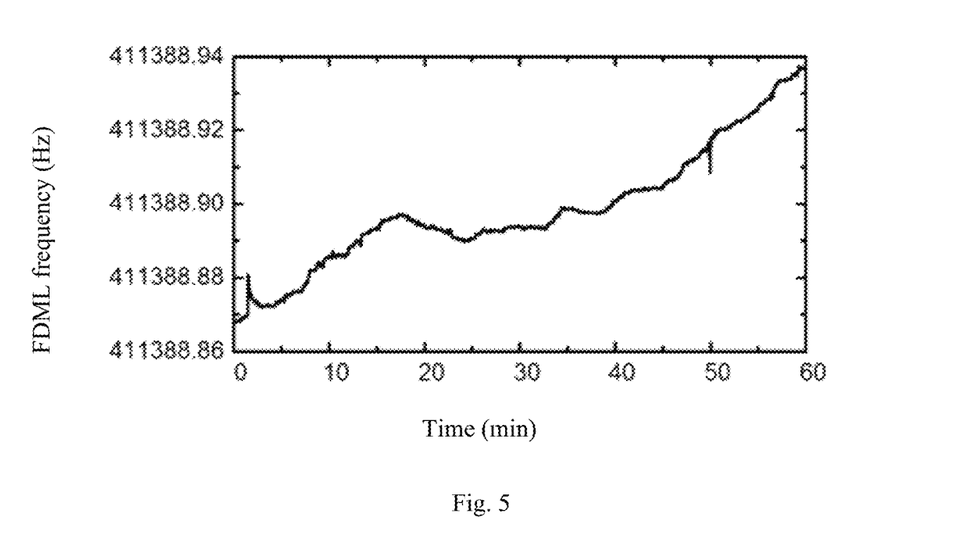
FIG. 5 shows a plot of the tuning rate of the laser under active control of a resonator having a temperature-stabilized cavity.

FIG. 5 shows the curve of the tuning rate of a controlled and temperature-stabilized FDML laser during a period of 60 minutes. The recognizable long-term drift around 80 mHz is due to an unavoidable change in the round-trip frequency of the laser, even with the temperature stabilization. The fine control can put up with this drift with no problem and is not disturbed by the temporary activating of a vacuum pump (near 0 and for 50 min), i.e., the fine control is robust.

It should be emphasized here that the aforementioned fast detecting oscilloscope is used here not only for the control, but also for representing the uncontrolled and the controlled laser emission in FIGS. 1 and 2. But no such measurement apparatus is needed for the control alone. There are also very simple and economical hardware implemented counters in existence (usually microprocessors) that are designed for very short trigger times. For example, such counters are used in photon-counting detectors. To carry out the invention, only their count values and the lengths of the counting time intervals are required. The latter can be predetermined in fixed manner and howsoever the user chooses—for example at 0.1 seconds or the like. The use of a hardware implemented counter is generally a preferred embodiment of the invention.

It may furthermore be advantageous for the counting time intervals to be shorter than the inverse round-trip frequency. In particular, it is then possible and advantageous to begin and end the counting time intervals at predetermined times after the start of a wavelength sweep.

Figure 6:
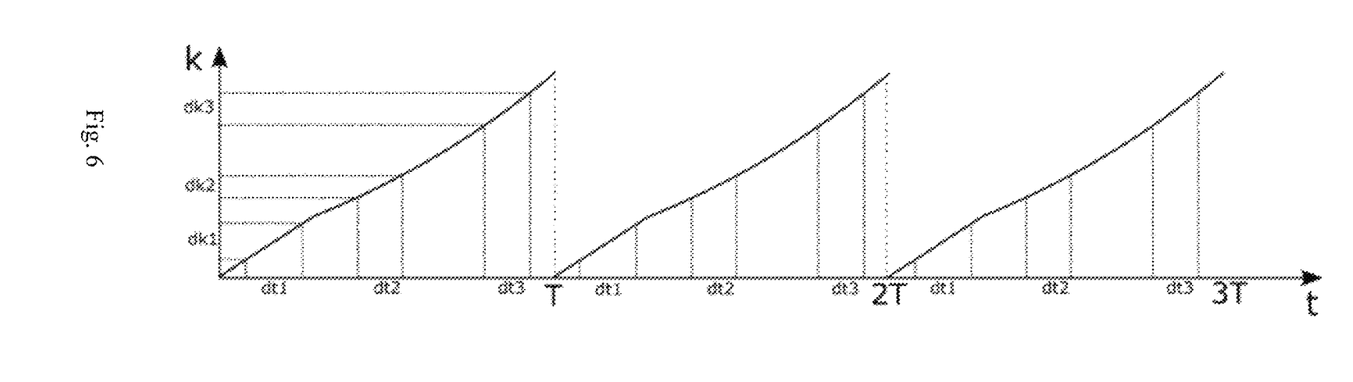
FIG. 6 shows a schematic sketch of the wave number curve of the filter selectivity to explain the measurement of the residual dispersion.

FIG. 6 shows schematically the wavelength variation of the FDML laser output represented here by the wave number $k=2\pi/\lambda$, where certain time gaps between the sweeps have been removed solely for clarity. The period length T thus corresponds to the duration of a sweep. The wavelength variation, as represented, is practically never strictly linear. Furthermore, three counting time intervals dt1, dt2 and dt3 are plotted in FIG. 6, each time repeating periodically with a period duration of T. The counting time intervals are assigned the wave number intervals dk1, dk2 and dk3, respectively.

The control method according to the invention can be attuned specifically to one of the series of counting time intervals, for example to dt1, by setting the counter in each sweep to zero at the beginning of dt1 and reading it off at the end of dt1. The counting time interval dt1 here is referenced to the start of a wavelength sweep, since only then is the fixed relationship with the wave number interval dk1 preserved over all sweeps. Accordingly, the counting time intervals begin and end at predetermined times after the start of a sweep.

The control then automatically optimizes the synchronism of the laser solely for the wave number interval dk1. The mean round-trip frequency for the wavelengths of the interval dk1 can thus be very precisely measured. This measurement is possible in exactly the same way for the other intervals dt2 and dk2, respectively, and dt3 and dk3, respectively. Thus, the mean round-trip times for different wavelength regions are ultimately known and the residual dispersion in the laser can be measured and optimized if necessary. Furthermore, counting time intervals that are especially suitable for the frequency control may be selected, or counting time intervals that are less suitable may alternatively be precluded from use for the control.

It may be advantageous, instead of the light regularly circulating in the resonator, to couple out the light reflected at the filter and analyze it, whereby the intensity dips in the transmitted light are reflected as intensity peaks in the reflected light and the measurement signal has less background due to the mean reflected intensity.

As already mentioned, the intensity dips of the laser emission or the deflections in the measurement signal of the at least one photodetector are thus far not detectable with a commercially justifiable expense, because the detection bandwidth required for this is too high and correspondingly capable measurement electronics is generally too expensive to be used only for the operational control of a laser. The practical "invisibility" of these dips and/or transient switch-off, however, also enables high-quality OCT with conventional FDML lasers.

Therefore, two proposals shall be given for making more easily detectable the deflections of the measurement signal at least for control electronics, so as to also enable the use of a low-cost technology.

One possibility of making the intensity dips visible even with detection hardware having a lesser detection bandwidth consists in making the intensity dips themselves longer and/or slower, so that the direct measurement signals possess lower frequency components. As shown by theoretical considerations, the durations of the dips and their flank steepness are directly related to the finesse of the optical filter: a higher finesse requires steeper flanks and lengthens the duration of the dips. Thus, a higher finesse would decrease the required detection bandwidth of the control.

Usually a tunable Fabry-Perot filter is used as the variable wavelength-selective optical filter in a FDML laser. This is an optical resonator having two mirrors with high reflectivity, e.g., 99.5%, whose spacing from each other can be adjusted. A variation of the mirror spacing produces a change in the transmitted wavelengths. All wavelengths which are an integer divisor of the mirror spacing are transmitted. By the finesse of a Fabry-Perot filter is meant the ratio of the wavelength spacing to the wavelength bandwidth for the transmitted wavelengths at fixed mirror spacing. The greater the reflectivity of the mirrors, the narrower are the transmitted wavelength ranges and the greater is the finesse of the filter.

The duration of the dips in turn lies roughly in the characteristic time region of the inverse wavelength bandwidth—and is thus proportional to the finesse. As an example for estimating the characteristic times involved here, we shall use a filter with a wavelength bandwidth of 0.1 nm corresponding to an optical frequency bandwidth of 17 GHz. Starting from the general correlation that the build-up time and the decay time of a bandpass filter correspond to half of the inverse filter bandwidth, dips on a time scale of 1/(2*17 GHz)=30 ps can be expected. Now, if an optical bandpass filter with less than 0.01 nm is preferably chosen, the dip duration will increase to more than 300 ps and can be detected with less bandwidth.

Hence, the specific choice of a sufficiently small wavelength bandwidth of the optical filter is one way of increasing the duration of the dips so much that the detection can be realized with an economically advantageous detection bandwidth. For a wavelength bandwidth of only 0.005 nm, for example, counting units with an input analog bandwidth of only just 1.7 GHz can be used. But since dips can also be detected that are shorter than the inverse analog bandwidth but then with reduced amplitude—measurements can still be carried out for example by lowering the counting threshold values. Therefore, optical filter widths of 0.2 nm, 0.1 nm, 0.05 nm or 0.02 nm are suitable for an analog detection bandwidth of 6 GHz, 3 GHz, 2 GHz, or 1 GHz.

However, this lengthening of the time of the dips significantly influences the quality of the FDML laser emission, since now an unmistakable "flickering" of the laser occurs. This is not desirable, at least for some applications.

A further possibility of carrying out the control according to the invention with low-cost measurement equipment is to detect an optical proxy in place of the laser intensity having the same origin as the rapid intensity dips, but responding to this origin on a different time scale. A proxy suitable for this can be obtained by superimposing a portion of the circulating laser light outcoupled from the resonator on itself at a later moment of time.

It is currently assumed that constantly recurring errors in the phase adaptation of the laser light circulating in the resonator, upon arrival at the optical filter for example, produce the very transient switch-offs. If this is so, these phase errors must also be present in the interference light and may also affect those light field portions having the difference frequency of the superimposed light fields after the superimposing of two laser light components which are time-delayed—and thus also wavelength-shifted relative to each other. Therefore, in these beats of the interference light hints as to the phase errors may be expected, which occur on a longer time scale than the intensity dips themselves. This is indeed the case, as has been experimentally discovered.

It has proven to be especially advantageous to modify the control method described in such a way that the laser light outcoupled from the resonator is taken to an interferometer with at least two different arm lengths, wherein the at least one photodetector detects at least the interference light at least at one output of the interferometer.

In order to generate such an interference, in the simplest instance the outcoupled laser light can be irradiated through a plane parallel plate. Reflections from the front and back side of the plate interfere with each other, and the partial beams in this way have a path length difference. The plate may be formed of glass, a semiconductor such as silicon, zinc selenide, germanium or another typical material with the highest possible refractive index for strong interference. Likewise, the conducting of the light through the interferometer may be fiber-bound with two 50/50 fiber couplers and two fibers of different length between the couplers. The first fiber coupler serves as a beam splitter, which takes the partitioned light through the two fibers of different length to the input of the second fiber coupler, in which the partial beams interfere. Furthermore, or alternatively, the two partial beams can also be removed at two different sites of the resonator to generate the interference. One or both partial beams may also be removed from the light reflected by the filter.

At the outputs of the interferometer, the interference light is preferably detected in heterodyne manner by means of a pair of balanced photodetectors as an electrical difference signal.

Preferably, the arm length difference here is between 3 and 150 millimeters. It is important, first and foremost, that the corresponding beat frequency is larger than the detection bandwidth of the downstream electronics. The measurement signal of the balanced photodetector detected with a detection bandwidth smaller than 6 GHz, preferably smaller than 4 GHz, especially preferably smaller than 2 GHz, most especially preferably smaller than 1 GHz, should then show a smooth zero line according to the expectation of the skilled person for a FDML laser, apart from remaining variations in the coupling ratio of the beam splitting, especially in dependence on the wavelength. But in fact transient deflections are detected, which can be interpreted as longer phases of a perturbed interference signal at the detectors. The deflections occur sporadically with positive and negative sign and amplitudes of different size.

Figure 7:
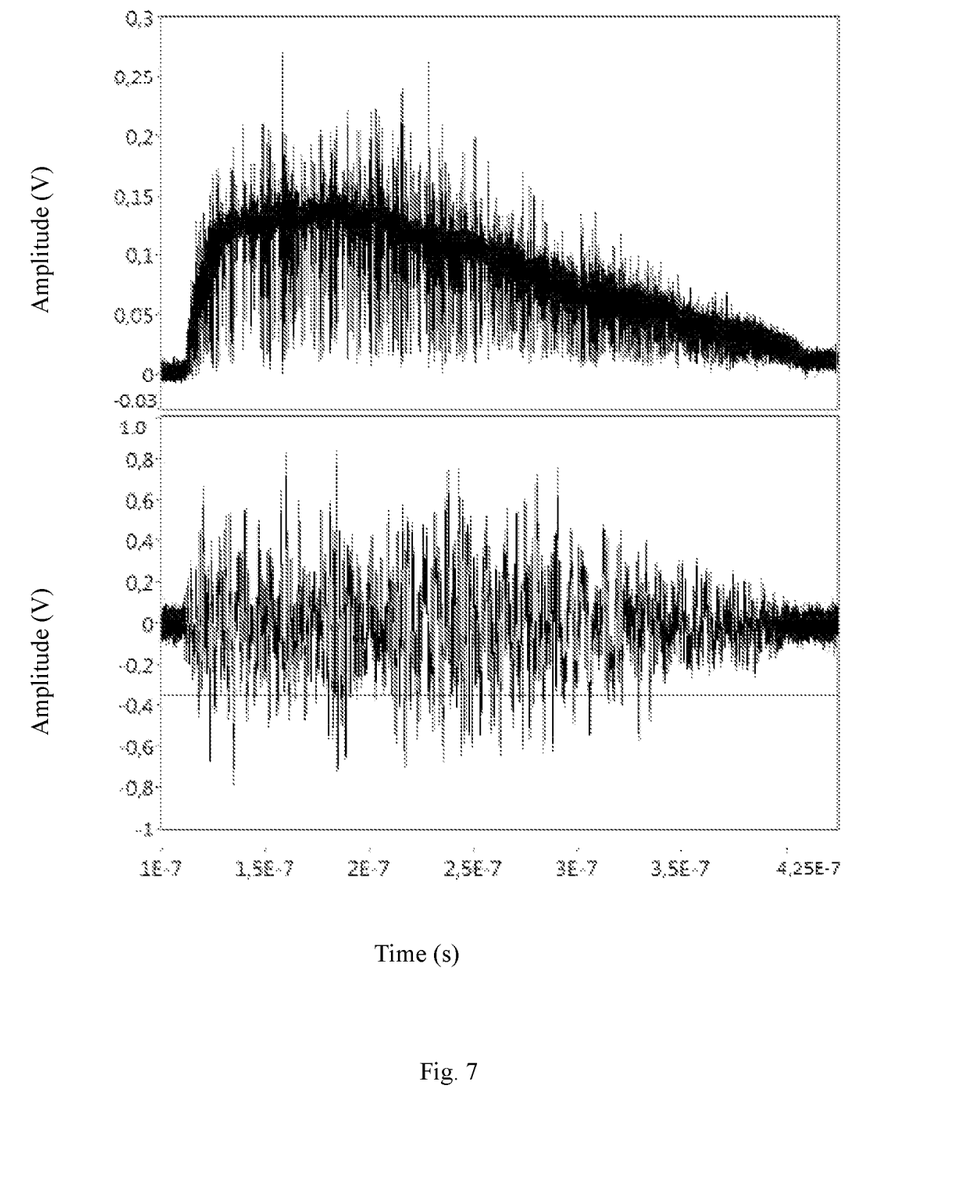
FIG. 7 shows a plot with comparison data between a proxy signal generated by interferometry (bottom) and the corresponding measurement signal of the laser emission without control.
Figure 8:
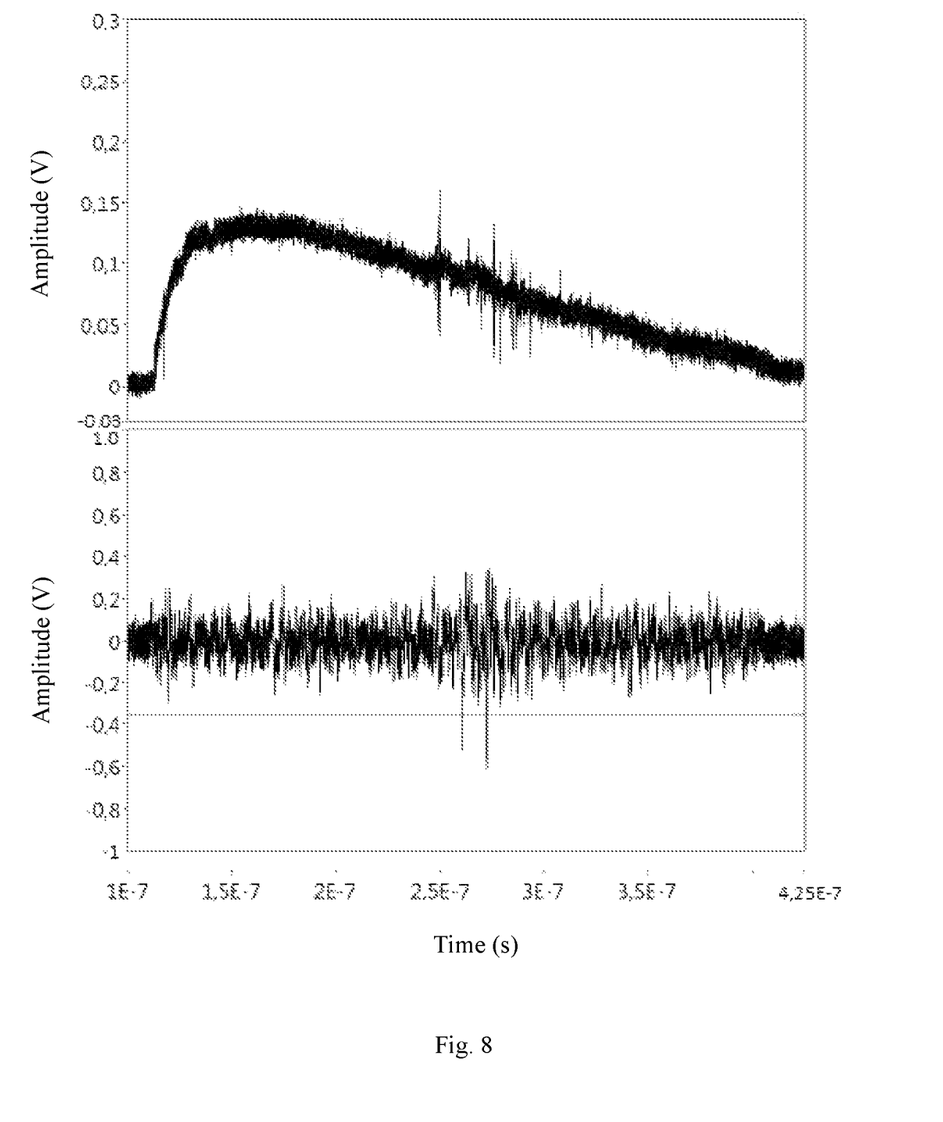
FIG. 8 shows a plot as in FIG. 5 with control activated based on the proxy signal.

What is noteworthy about the measurement signal of the interference light is that its deflections are excellently correlated with the very much shorter intensity dips of the laser emission. FIGS. 7 and 8 show measurement curves of the interference light signal (at the bottom in each case) in a direct time comparison with the intensity curves of the laser during a sweep (at the top in each case). The deflections in the interference light diminish significantly when the laser is optimally synchronized. Therefore, the laser control according to the invention can also be readily performed based on the count values of the deflections in the measurement signal of the interference light, which is merely a proxy. This has been in fact realized in the laboratory of the inventors with a commercially available and economical measurement card having a 400 MHz bandwidth.

The FDML laser emission is in no way impaired during the control based on the proxy, in particular, no "flickering" occurs. The coherence of the radiation is instead improved for all wavelengths by the control.

The two modifications of the control method according to the invention described above aim to have the detecting of the measurement signal occur with a detection bandwidth of a few Gigahertz, most especially preferably with less than 1 GHz. This can also be achieved with low-cost measurement techniques.

Instead of the control of the tuning rate, the round-trip frequency may alternatively be changed instead. In particular, it is possible, based on the fine control, to vary the resonator length by a short free beam stretch, by a fiber heater or by a usual piezo-based fiber stretcher.

Measures for the temperature stabilization of the laser resonator, especially in regard to the temperature of the fiber coil, may be of advantage to the control. For this, the glass fiber coil may be mounted on a carrier with good thermal conductance, such as aluminum instead of the plastics usually used for glass fibers, and this carrier may then be temperature-stabilized by Peltier elements. It may be advantageous for the greater portion of the resonator to be thermally insulated, e.g., by foamed plastics.

What is claimed is:

1. A method for preserving the synchronism of a Fourier Domain Mode Locked (FDML) laser, wherein the FDML laser comprises at least one dispersion-compensated resonator having at least one variable wavelength-selective optical filter, wherein laser light circulates in the at least one resonator with a round-trip frequency and the at least one optical filter is repeatedly altered in its wavelength selectivity with a tuning rate, wherein the FDML laser is synchronized when the tuning rate is an integer multiple of the round-trip frequency, the method comprising:
    outcoupling of at least one portion of the laser light from the at least one resonator;
    detecting the at least one portion of the outcoupled laser light with at least one photodetector;
    counting deflections in a measurement signal of the at least one photodetector during consecutive counting time intervals;
    controlling the round-trip frequency or the tuning rate such that ratios of count values to lengths of the counting time intervals are maintained in a predetermined setpoint interval.

2. The method according to claim 1, wherein frequency components of the measurement signal are suppressed to the first N multiples of the round-trip frequency, where N is a predetermined natural number.

3. The method according to claim 2, wherein the measurement signal is highpass-filtered with a limit frequency up to 100 MHz.

4. The method according to claim 1, wherein only deflections in the measurement signal are counted whose difference from a mean value of the measurement signal is greater than a predetermined threshold value.

5. The method according to claim 1, wherein the counting time intervals are shorter than the inverse round-trip frequency.

6. The method according to claim 5, wherein the counting time intervals start and end at predetermined times after the start of a wavelength sweep.

7. The method according to claim 1, wherein the at least one optical filter includes a variable wavelength tunable optical filter having a wavelength bandwidth less than 0.2 nm.

8. The method according to claim 1, wherein the at least one portion of outcoupled laser light is provided to an interferometer with at least two different arm lengths, wherein the at least one photodetector detects at least interference light at least at one output of the interferometer.

9. The method according to claim 8, wherein the at least two arm lengths have an arm length difference between 3 millimeters and 150 millimeters.

10. The method according to claim 7, wherein detection of the measurement signal occurs with a detection bandwidth less than 6 GHz.

11. The method according to claim 1, wherein the method switches to a rough control upon passing a predetermined maximum count value in a counting time interval until again falling below the maximum count value.

12. The method according to claim 1, further comprising:
    adaptive adaptation of at least one of the following control parameters: duration and position of the counting time intervals, widths of control steps, counting threshold values, or counting dead times.

13. The method according to claim 1, further comprising:
    taking at least one of active or passive measures for temperature stabilization of the at least one resonator.

14. The method according to claim 1, wherein the laser light reflected at the at least one optical filter is used for the controlling.

15. The method according to claim 1, wherein at least some the laser light is removed at different places of the at least one resonator to generate interference.

16. A method for preserving the synchronism of a Fourier Domain Mode Locked (FDML) laser, wherein the FDML laser comprises at least one dispersion-compensated resonator having at least one variable wavelength-selective optical filter, wherein laser light circulates in the at least one resonator with a round-trip frequency and the at least one optical filter is repeatedly altered in its wavelength selectivity with a tuning rate, wherein the FDML laser is synchronized when the tuning rate is an integer multiple of the round-trip frequency, the method comprising:
    outcoupling of at least one portion of the laser light from the at least one resonator;
    detecting the at least one portion of the outcoupled laser light with at least one photodetector;
    counting deflections in a measurement signal of the at least one photodetector during consecutive counting time intervals;
    controlling the round-trip frequency or the tuning rate such that ratios of count values to lengths of the counting time intervals are maintained in a predetermined setpoint interval; wherein:
    frequency components of the measurement signal are suppressed to the first N multiples of the round-trip frequency, where N is a predetermined natural number;
    the measurement signal is highpass-filtered with a limit frequency up to 100 MHz;
    only deflections in the measurement signal are counted whose difference from a mean value of the measurement signal is greater than a predetermined threshold value;
    the counting time intervals are shorter than the inverse round-trip frequency;
    the counting time intervals start and end at predetermined times after the start of a wavelength sweep;
    the at least one optical filter includes a variable wavelength-sensitive optical filter having a wavelength bandwidth less than 0.2 nm;
    the at least one portion of outcoupled laser light is provided to an interferometer with at least two different arm lengths;
    the at least one photodetector detects at least interference light at least at one output of the interferometer;

the interferometer comprises two arm lengths with an arm length difference between 3 millimeters and 150 millimeters;

detection of the measurement signal occurs with a detection bandwidth less than 6 GHz;

the method switches to a rough control upon passing a predetermined maximum count value in a counting time interval until again falling below the maximum count value;

the laser light reflected at the at least one optical filter is used for the controlling; and at least some of the laser light is removed at different places of the at least one resonator to generate interference.

\* \* \* \* \*